United States Patent [19]

Greve et al.

[11] 4,135,207

[45] Jan. 16, 1979

[54] APPARATUS FOR READING AN OPTICAL RADIATION-REFLECTING RECORD CARRIER INCLUDING A NARROW FOCUS CONTROL BEAM

[75] Inventors: Peter F. Greve; Willem G. Opheij, both of Eindhoven, Netherlands

[73] Assignee: U.S. Philips Corporation, New York, N.Y.

[21] Appl. No.: 811,612

[22] Filed: Jun. 30, 1977

[30] Foreign Application Priority Data

Mar. 23, 1977 [NL] Netherlands ................ 7703123

[51] Int. Cl.² .................. H04M 5/76; G11B 7/12
[52] U.S. Cl. .................. 358/128; 179/100.3 V
[58] Field of Search ............ 358/127, 128, 130, 132; 179/100.3 V, 100.3 G, 100.41 L; 340/173 LT, 173 LM; 250/201; 365/120, 124

[56] References Cited

U.S. PATENT DOCUMENTS

| 3,876,842 | 4/1975 | Bouwhuis | 179/100.3 V |
|---|---|---|---|
| 3,913,076 | 10/1975 | Lehureau et al. | 179/100.3 V |
| 3,924,063 | 12/1975 | Simons | 358/128 |
| 3,971,002 | 7/1976 | Bricot et al. | 358/128 |
| 3,974,327 | 8/1976 | Van Disk | 179/100.3 V |
| 4,005,259 | 1/1977 | Kaneko | 179/100.3 V |

FOREIGN PATENT DOCUMENTS 2436395 2/1975 Fed. Rep. of Germany ... 179/100.3 V

Primary Examiner—Raymond F. Cardillo, Jr.
Attorney, Agent, or Firm—Frank R. Trifari; Simon L. Cohen

[57] ABSTRACT

An apparatus is described for reading an optically encoded radiation-reflecting information carrier, using an opto-electronic focussing error detection system. The path of the read beam which is directed towards the information carrier includes a radiation-deflecting element producing a narrow focussing beam that co-operates with two focussing detectors to produce an error signal.

9 Claims, 5 Drawing Figures

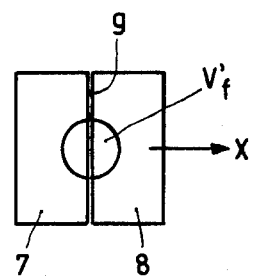 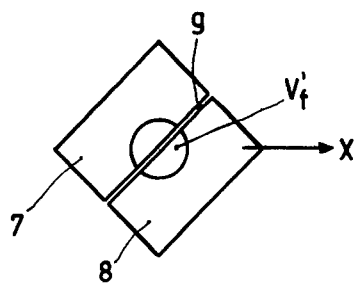
Fig.2a  Fig.2b
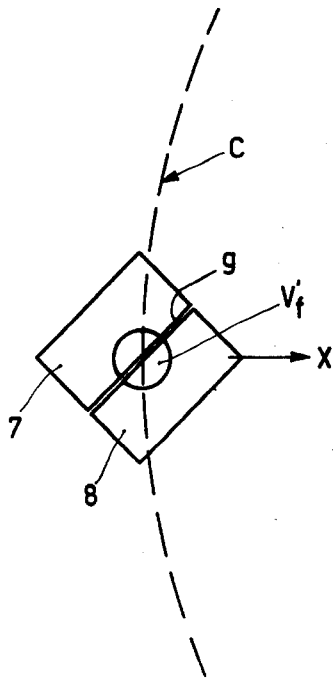 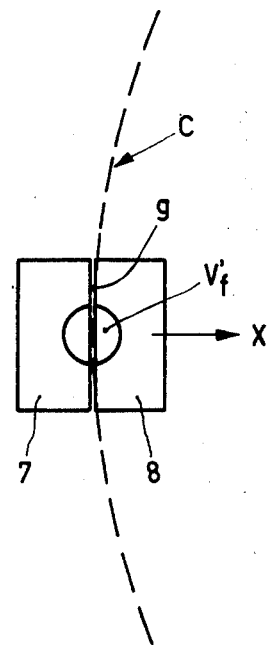
Fig.3a  Fig.3b

APPARATUS FOR READING AN OPTICAL RADIATION-REFLECTING RECORD CARRIER INCLUDING A NARROW FOCUS CONTROL BEAM

The invention relates to an apparatus for reading an optical radiation-reflecting information carrier. The apparatus comprises a radiation source which produces a read beam, an objective system for passing the read beam via the information carrier to a radiation-sensitive information detector whose output signal represents the information, and an optoelectronic focussing error detection system for determining a deviation between the desired and the actual position of the plane of focussing of the objective system, which focussing error detection system comprises two radiation-sensitive focussing detectors which co-operate with a narrow focussing beam passing obliquely through the objective system, the difference in the output signals of the focussing detectors providing an indication about said deviation.

In this respect "focussing beam" is to be understood to mean an auxiliary beam with the aid of which the focussing errors of the read beam are detected. The "focussing detectors" are radiation-sensitive detectors which co-operate with said auxiliary beam.

Such apparatus is described in U.S. Pat. No. 3,876,841. This apparatus is for example used for reading an information carrier on which a (color) television program is stored. The information structure then consists of a multitude of areas alternating with intermediate areas which are arranged in accordance with a spiral track, the areas and intermediate areas of which have a different influence on a read beam.

The information is then for example contained in the lengths of the areas and those of the intermediate areas. To obtain sufficiently long playing time the details of the information structure will be very small for limited dimensions of the information carrier. For example, if a 30-minute television program is stored on one side of a disc-shaped round information carrier with an outer radius of approx. 15 cm. and an inner radius of approx. 6 cm, the width of the tracks will be approx. 0.5 $\mu$m and the average length of the areas and of the intermediate areas will be approximately 1 $\mu$m.

In order to enable such minute details to be read an objective system with a fairly large numerical aperture must be employed. However, the depth of focus of such an objective system is small. As in the read apparatus variations in the distance between the plane of the information structure and the objective system may occur which are greater than the depth of focus, steps must be taken to enable these variations to be detected and to enable the focussing to be corrected.

In the apparatus in accordance with U.S. Pat. No. 3,876,841 a narrow beam is therefore split off, derived from the read beam before this beam enters the objective system. The narrow beam, the focussing beam, passes obliquely through the objective system. After this beam has been reflected by the information carrier, it traverses the objective system for a second time and then forms a radiation spot, the focussing spot, in the plane of the two focussing detectors. The symmetry of the focussing spot relative the focussing detectors then provides an indication of the degree of focussing of the read beam on the information structure.

In the known read apparatus a number of additional elements are needed, such as a semitransparent mirror, a fully reflecting mirror, and an additional lens for focussing the auxiliary beam in the focal plane of the objective system. The positions of the additional elements are very critical.

It is an object of the present invention to provide an apparatus of the type mentioned in the preamble in which a minimal number of additional elements is needed for focussing detection. The apparatus in accordance with the invention is characterized in that the radiation path of the read beam which is directed towards the information carrier includes a radiation-deflecting element whose surface area is substantially smaller than the cross-sectional area of the read beam.

Owing to the radiation-deflecting element a small portion of the read beam is diverted in a direction different from the rest of the read beam. This portion, the focussing beam, forms an additional radiation spot on the information structure. This spot is situated at a small distance (for example 100 $\mu$m) from the radiation spot which is formed by the read beam. As only a small portion is derived from the read beam, the actual readout of the information will not be affected significantly. The small influence on the readout can further be reduced by arranging the connecting line between the optical axis of the objective system and the radiation-deflecting element at an angle of approx. 45° with the direction in which an information track of the information carrier is read.

Preferably, the information detector and the focussing detectors are disposed in the same plane perpendicular to the optical axis of the objective system.

In a first embodiment of an apparatus in accordance with the invention the radiation-deflecting element is constituted by a diffraction grating.

In a second embodiment of an apparatus in accordance with the invention the radiation-deflecting element consists of an optical wedge.

As a radiation source a gas laser may be used, such as a helium-neon laser. In that case the distance between the objective system and the plane of the detectors is comparatively great. The focussing spot is then situated at a comparatively great distance from the read spot which is formed on the plane of the detectors by the read beam.

It is alternatively possible to employ a (semiconductor) diode laser as radiation source. Such a laser may also be used as information detector. In that case the radiation which is reflected by the information carrier need not be separated from the radiation which is directed towards the information carrier. The optical read unit can then be kept simple and compact.

Furthermore, the objective system may then have a low magnification. If in such a read apparatus a focussing beam is formed by means of a deflecting element, the focussing spot may be situated so closely to the read spot that the focussing detectors cannot be arranged within the required distance to the diode laser. If it were possible to arrange the focussing detectors in the desired position, a part of the read beam would already be incident on the focussing detectors in the case of a slight focussing error of the read beam, resulting in an error in the focussing control signal.

In order to avoid these problems an apparatus in accordance with the invention, in which the radiation-deflecting element is an optical wedge, is furthermore characterized in that a second optical wedge is disposed within the image of the first optical wedge formed with the aid of the information carrier and that lens element of the objective system that is nearest the information carrier. This means that the area of the second optical wedge is smaller than or equal to the area of the first optical wedge.

The objective system may comprise a plurality of lens elements or one lens elements. In the last-mentioned case the "lens element of the objective system nearest the information carrier" is the objective system itself.

The second optical wedge, whose angle of refraction is preferably greater than that of the first optical wedge, deflects the focussing beam reflected by the information carrier additionally relative to the read beam, so that the distance between the images of the focussing spot and the read spot increases.

In order to ensure that the second wedge always remains in the image of the first wedge independently of the position of the information carrier relative to the objective system, the optical wedges, in accordance with a further characteristic feature of the invention, are disposed in the back focal plane of the lens element of the objective system nearest the information carrier.

In accordance with a further characteristic feature of an apparatus in accordance with the invention the dividing line between the focussing detectors makes an acute angle with the direction in which the focussing spot moves owing to focussing errors. By means of this step it is avoided that the position of the focussing detectors is very critical.

The invention will now be described in more detail on the basis of an embodiment of an apparatus which employs a diode laser as the radiation source and optical wedges as the radiation-deflecting elements. In this description reference is made to the drawing, in which:

FIGS. 2a and 2b show different orientations of the focussing detectors relative to the directions of movement of the focussing spot, and FIGS. 3a and 3b show how the focussing spot moves relative to the focussing detectors when the optical wedges are rotated relative to the optical axis.

Figure 1:
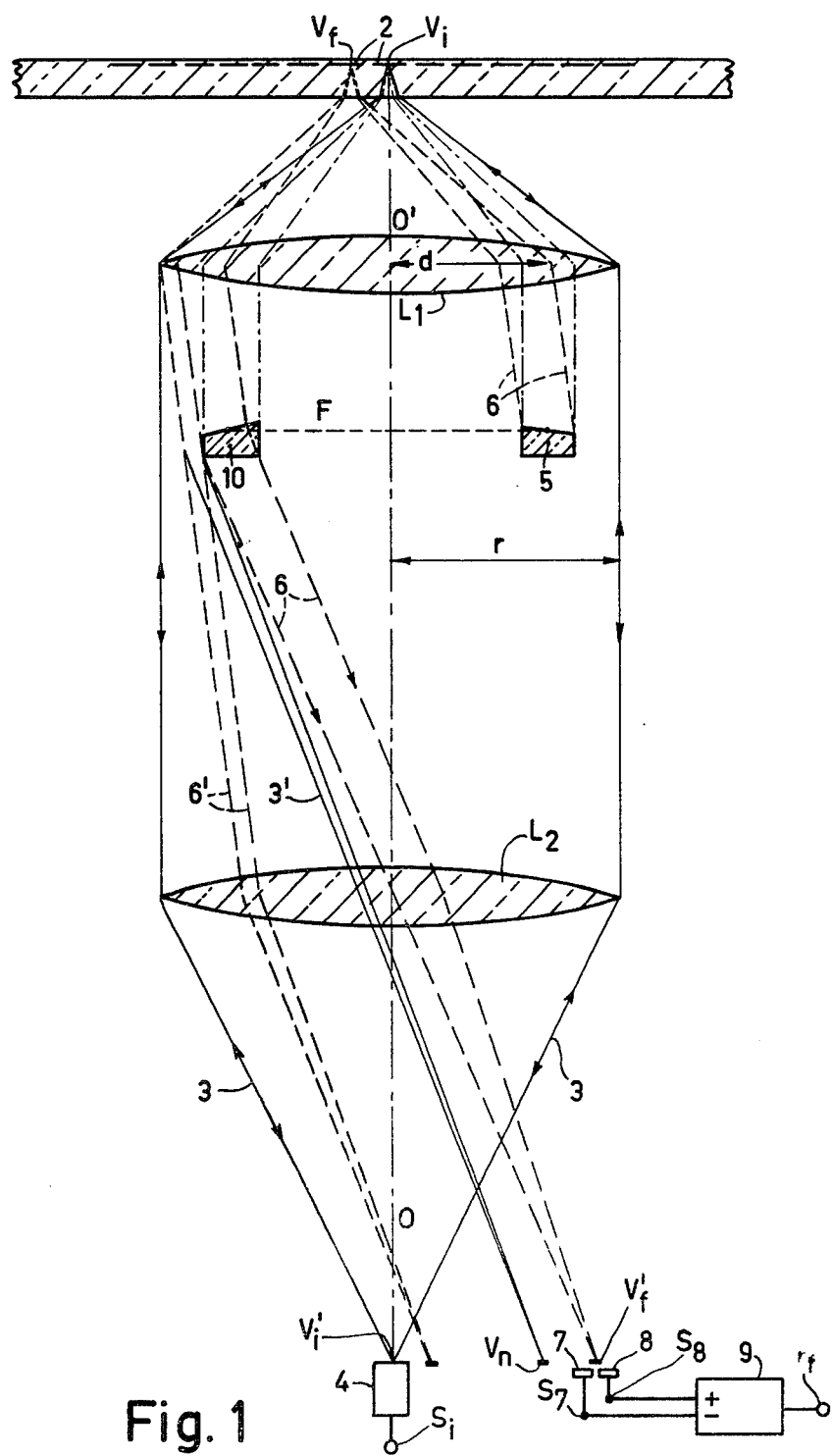
FIG. 1 shows a first embodiment of an apparatus in accordance with the invention.

FIG. 1 shows a part of a round disc-shaped information carrier 1 in radial cross-section. The information structure is for example a phase structure and comprises a multitude of concentric or quasi-concentric tracks 2, which tracks consist of a sequence of areas and intermediate areas. The areas may for example be situated at a different level in the information carrier than the intermediate areas. The information may for example be a color television program, but it may alternatively be other information, such as a multitude of different images or digital information. Preferably, the information structure is situated at the back of the information carrier 1.

The information carrier is illuminated by a read beam 3 produced by a diode laser 4. An objective system, which consists of a single lens, or as shown in FIG. 1, of two lenses $L_1$ and $L_2$ focusses the read beam to a spot $V_i$ on the information structure. The read beam 3 is then reflected by the information structure and upon rotation of the information carrier it is modulated, in accordance with the information which is contained in a track portion to be read. After reflection the read beam traverses the objective system for a second time, an image $V'_i$ (the read spot) being formed of the spot $V_i$. At the location of the read spot $V'_i$ a detector is situated which converts the modulated read beam into an electrical signal $S_i$.

If the radiation source is a diode laser it is possible as is described in the published German Pat. No. 2,244,119 to use this diode laser as a detector. Depending on the intensity of the reflected read beam the electrical resistance across the diode laser or the intensity of the radiation emitted from the rear of the diode laser will vary. When a diode laser is used as radiation source no beam-splitting element is necessary to separate the modulated read beam reflected by the information carrier from the unmodulated read beam which is directed towards the information carrier.

In accordance with the invention a small optical wedge 5 is disposed in the path of the read beam 3. This wedge splits off a sub-beam 6 (respresented by dashed lines in FIG. 1) from the read beam. This sub-beam is focussed to a radiation spot $V_f$ on the information structure by the lens $L_1$. After reflection at the information structure and a second passage through the objective system the focussing beam forms a radiation spot $V'_f$ (focussing spot) on an assembly of two focussing detectors 7 and 8. If the distance between the plane of the tracks 2 and the objective system is correct, the focussing spot is symmetrical relative to the focussing detectors, so that both detectors receive an equal amount of radiation and the output signals $S_7$ and $S_8$ are equal. If the plane of the information structure moves downwards relative to the objective system, the point where the principal ray of the reflected beam 6 enters the lens $L_1$ will be shifted towards the optical axis OO'. The deflection of the beam 6 by the objective system is then slightly less and the focussing spot $V'_f$ moves to the left. The detector 7 then receives more radiation than the detector 8. If the plane of the tracks 2 moves upwards, the reverse takes place, and the detector 7 receives less radiation than the detector 8.

The signals $S_7$ and $S_8$ from the detectors are applied to an electronic circuit 9. In this circuit the signals are substracted from each other in a manner known per se. At the output of the circuit 9 a focussing control signal $r_f$ is then obtained with which the focussing of the objective system can be corrected, for example by moving this system along the optical axis OO'. If the radiation source is a diode laser, the optical read unit may also be moved along the optical axis.

The optical wedge, or a diffraction grating, is disposed in the path of the read beam which is directed towards the information carrier, and the focussing beam which passes through the lens $L_1$ is narrow. Thus it is ensured that the spot $V_f$ is appreciably larger than the spot $V_i$. The details of the information structure then cannot be distinguished with the focussing beam, so that the signals $S_7$ and $S_8$ will not exhibit any high-frequency variations.

For the sake of clarity the reflected focussing beam is shown passing through the border of the lens $L_1$ in FIG. 1. In reality the point where the principal ray of this beam enters the lens $L_1$ will be nearer the optical axis.

In the apparatus in accordance with the invention the focussing beam is formed with very simple means, namely with a wedge-shaped element only or a small diffraction grating only. The wedge on the diffraction grating may for example be mounted on a transparent plate. This plate may be fixed relative to the lens $L_1$ in the direction of the optical axis OO'.

The angle of refraction of the wedge 5 is subject to an upper limit, so that this is also the case for the deflection of the focussing beam by said wedge. It is desirable that the point of the information structure to which the focussing is adjusted is nearest the point of the information structure where read-out is effected. The distance between $V_i$ and $V_f$ is for example 100 μm. If the information carrier is oblique relative to the optical axis or if variations in thickness of the record carrier occur it is then also possible to maintain a correct focussing of the read beam.

In order to have a sufficient distance between the focussing spot $V'_f$ and the read spot $V'_i$ deflection by the wedge 5 alone suffices if the magnification of the objective system is sufficiently high, or if the radiation source does not at the same time constitute the information detector, so that the radiation reflected by the record carrier can be mirror-diverted and the detectors can be arranged at a suitable distance from the information carrier.

When a diode laser is used as radiation source (see FIG. 1) and an objective system images the diode laser onto the information structure with a ratio of 2:1, the distance between the objective system and the diode laser being preferably small, the distance as a result of the deflection by the wedge 5 between the spots $V'_i$ and $V'_f$ is too small. In that case it is possible in accordance with the invention to employ a second optical wedge 10. This wedge is then disposed in the path of the reflected focussing beam. The wedge 10 may have a greater angle of refraction than the wedge 5, because it does not affect the distance between the spots $V_i$ and $V_f$.

Also if a satisfactory distance between the spots $V'_i$ and $V'_f$ can be obtained with a wedge 5, a second wedge 10 may be used. By means of the second wedge it is then possible to prevent radiation of the read beam from being incident on the focussing detectors when the information structure is out of focus, resulting in the read spot $V'_i$ being "blown up".

The wedge 10 should then be disposed in the shadow of the wedge 5 or, in other words, the wedges 5 and 10 must be imaged onto each other by the lens $L_1$ via the information carrier. In FIG. 1 the marginal rays of said imaging are represented by dash-dot lines.

If the plane of the wedges were situated at an arbitrary height between the lenses $L_1$ and $L_2$, the image of the wedge 5 would depend on the distance between the plane of the information structure and the objective system. Therefore care is taken, in accordance with the invention, that the plane of the wedges coincide with the focal plane F of the lens $L_1$.

In order to ensure that all the radiation which is deflected by the first wedge (5) passes through the second wedge (10), the second wedge would have to be slightly larger than the first wedge. However, a small portion of the read beam 3 itself would then pass through the second wedge and result in a separate radiation spot $V_n$ on the suface of the detectors; compare the small beam 3' indicated by the uninterrupted lines in FIG. 1. In the situation of FIG. 1, in which the read beam is correctly focussed on the information structure, the radiation spot $V_n$ is situated closely to the focussing detectors. If the plane of the tracks 2 should then be moved upwards, the radiation spot $V_n$ would even fall onto the detector 7 in the case of a small focussing error, thus giving rise to an erroneous signal $r_f$.

Therefore, the area of the wedge 10 should at the most be equal to that of the wedge 5 and the wedge 10 is disposed in the shadow of the wedge 5. As a result of this, a part of the focussing beam, the beam 6' represented by the dashed lines, will not be incident on the detectors 7 and 8. However, this merely results in the signals $S_7$ and $S_8$ being slightly smaller. The sensitivity of the detection system for focussing errors is not significantly affected thereby.

Furthermore, care is taken that the distance d between the optical axis OO' and the point where the focussing beam enters the lens $L_1$ is approximately 0.7 times the radius r of the lens pupil. For the read method shown in FIG. 1, where the read beam traverses the information carrier twice, the influence of spherical aberration in the objective system on the shape of the spot $V_i$ in the case of variations in the thickness of the information carrier is then minimal for the focussing control method described.

In FIGS. 2a and 2b the two focussing detectors 7 and 8 are shown with the focussing spot $V'_f$ projected thereon. It is assumed that in the case of a variation of the focussing of the read beam the focussing spot $V'_f$ moves in the x-direction. For an optimum sensitivity to focussing errors of the detection system the line g separating the detectors 7 and 8 should be perpendicular to the x-direction, as is shown in FIG. 2a. However, the derived focussing control signal $r_f$ would then greatly depend on the position of the focussing detectors in the x-direction.

In accordance with the invention the detectors 7 and 8 are arranged so that the line of separation g makes an acute angle, for example 45°, with the x-direction, as is shown in FIG. 2b. The zero passage of the signal $r_f$ can then be adjusted by rotating the wedge 5 or the wedges 5 and 10 about the optical axis OO'. In FIGS. 3a and 3b the path described by the focussing spot $V'_f$ if the wedges are rotated is represented by the curve c. In the case of FIG. 3a, in which the detectors have the orientation of FIG. 2b, the radiation distribution over the focussing detectors will change when the focussing spot moves over the detectors in accordance with the curve c. During assembly of the read apparatus, after the plate with the wedges has been mounted between the lenses $L_1$ and $L_2$ and the focussing has been adjusted correctly, the plates can then be rotated so that the focussing spot is symmetrical relative to the detectors 7 and 8. This is not possible if the focussing detectors have the orientation in accordance with FIG. 2a. In that case the radiation distribution over the focussing detectors cannot be influenced by rotating the wedge plate through small angles. Compare FIG. 3b.

If the focussing detectors have the orientation of FIG. 2b, moving the focussing spot $V'_f$ in the x-direction, i.e. a movement as a result of the focussing errors, will result in a smaller variation of the signals $S_7$ and $S_8$ than if these detectors were oriented in accordance with FIG. 2a. Consequently, the sensitivity of the detection system is reduced. However, this presents no problems. The sensitivity also remains adequate in the case of the arrangement of FIG. 2b. The advantage obtained in respect of the positional tolerance of the focussing detectors is then more important than the loss of sensitivity.

As a focussing beam is derived from the read beam, this read beam will no longer fill the pupil of the lens $L_1$ in an optimum manner. As a result, the radiation spot $V_i$ will become slightly larger in the direction of the line connecting the optical axis OO' to the center of the deflectin element (a wedge or a grating). The resolution of the read beam in this direction is then slightly reduced. The influence of this, in itself minor, effect may further be reduced by arranging the deflection element so that an imaginary line which connects the optical axis and the deflection element makes an angle of approximately 45° with the direction of a track portion to be read.

What is claimed is:

1. Apparatus for reading a radiation-reflecting information carrier, the information being recorded therein along tracks, said apparatus comprising radiation source and information detector means for providing a read beam, an objective system means including a lens element for focussing the read beam on the record carrier and for passing the read beam via the information carrier to the radiation source and information detector means, said radiation source and information detector means further comprising means responsive to said reflected read beam for providing an output signal corresponding to the information from the record carrier, radiation deflecting element means in the path of the read beam and having a surface area substantially smaller than the cross-sectional area of the read beam for providing a narrow focussing beam passing obliquely through the objective system toward said record carrier to be reflected thereby, and radiation sensitive focussing detector means in the path of the narrow focussing beam reflected by the record carrier and including two radiation sensitive detectors for providing a focussing error signal indicating deviations in the focus of the objective system means with respect to the information carrier.

2. An apparatus as claimed in claim 1, wherein the radiation deflecting element means is constituted by a diffraction grating.

3. An apparatus as claimed in claim 1, wherein the radiation deflecting element means is constituted by an optical wedge.

4. An apparatus as claimed in claim 3, wherein the radiation path of the focussing beam which is reflected by the information carrier includes a second optical wedge.

5. An apparatus as claimed in claim 4, wherein the second optical wedge is disposed within an image of the first optical wedge formed with the aid of the information carrier and the lens element of the objective system nearest the information carrier.

6. An apparatus as claimed in claim 5, wherein the optical wedges are disposed in the back focal plane of the lens elment of the objective system nearest of the information carrier.

7. An apparatus as claimed in claim 1, wherein the deflecting element means is arranged so that the distance between the optical axis of the objective system and the point where the focussing beam for the first time enters the lens element of the objective system nearest the information carrier equals approximately 0.7 times the radius of the pupil of said lens element.

8. An apparatus as claimed in claim 1, wherein a dividing line separates the focussing detectors, said dividing line making an acute angle with the direction in which the focussing spot moves as a result of focussing errors.

9. An apparatus as claimed in claim 1, wherein an imaginary connecting line between the optical axis of the objective system means and the radiation-deflecting element means makes an angle of approximately 45° with the direction in which an information track of the record carrier is read.

* * * * *